United States Patent
Kornbacher, III

(10) Patent No.: US 10,012,331 B2
(45) Date of Patent: Jul. 3, 2018

(54) DIRECTIONAL MAINTAINING APPARATUS FOR FLEXIBLE CONDUIT

(71) Applicant: J. Gregory Kornbacher, III, Fontana, CA (US)

(72) Inventor: J. Gregory Kornbacher, III, Fontana, CA (US)

( * ) Notice: Subject to any disclaimer, the term of this patent is extended or adjusted under 35 U.S.C. 154(b) by 0 days.

(21) Appl. No.: 15/146,854

(22) Filed: May 4, 2016

(65) Prior Publication Data
US 2016/0327186 A1 Nov. 10, 2016

Related U.S. Application Data

(60) Provisional application No. 62/156,468, filed on May 4, 2015.

(51) Int. Cl.
| | | |
|---|---|---|
| *F16L 11/00* | (2006.01) |
| *F16L 11/12* | (2006.01) |
| *F16L 3/00* | (2006.01) |
| *F16L 3/26* | (2006.01) |

(52) U.S. Cl.
CPC .............. *F16L 11/12* (2013.01); *F16L 3/003* (2013.01); *F16L 3/26* (2013.01)

(58) Field of Classification Search
CPC ...................................................... F16L 11/12
USPC .................................... 138/110, 119, DIG. 8
See application file for complete search history.

(56) References Cited

U.S. PATENT DOCUMENTS

| | | | | | |
|---|---|---|---|---|---|
| 805,579 | A | * | 11/1905 | Patchen | F16D 3/845 138/110 |
| 1,731,322 | A | * | 10/1929 | Riddle | A61C 17/043 138/131 |
| 2,277,864 | A | * | 3/1942 | Horvath | B65H 75/362 138/110 |
| 2,327,347 | A | * | 8/1943 | Gibbin | A61C 17/043 138/145 |
| 2,640,502 | A | * | 6/1953 | Powers | B65H 75/36 138/103 |
| 3,610,289 | A | * | 10/1971 | Moss | B60T 17/046 138/110 |
| 4,327,775 | A | * | 5/1982 | Tally | B60H 1/00571 138/103 |
| 4,456,034 | A | * | 6/1984 | Bixby | F16L 11/118 138/103 |
| 5,246,254 | A | * | 9/1993 | LoJacono, Jr. | F16L 35/00 138/109 |
| 5,894,866 | A | * | 4/1999 | Horst | F16L 35/00 138/103 |
| 6,105,620 | A | * | 8/2000 | Haberl | F16L 11/20 138/103 |

(Continued)

*Primary Examiner* — James Hook
(74) *Attorney, Agent, or Firm* — Loza & Loza, LLP; Eric Madigan

(57) ABSTRACT

A bendable support insert includes a coiled based portion and a malleable elongated portion. The malleable elongated portion is perpendicularly connected to the coiled based portion from an end. The bendable support insert is sized to be applicable for existing flexible conduit tubing so that an adapting device is able to internally connect the bendable support insert within the flexible conduit tubing. The insertion and placement of the bendable support insert permits the flexible conduit tubing to be configured according desired layout. Additionally, the bendable support insert maintains the user-define configuration throughout the lifespan of the assembly.

8 Claims, 3 Drawing Sheets

(56) References Cited

U.S. PATENT DOCUMENTS

| | | | | |
|---|---|---|---|---|
| 6,557,589 B2* | 5/2003 | Bozic | ............ | F16L 3/00 |
| | | | | 138/106 |
| 6,568,610 B1* | 5/2003 | Ericksen | ............ | A01G 25/14 |
| | | | | 138/DIG. 8 |
| 6,901,698 B2* | 6/2005 | Manning | ............ | A01G 25/02 |
| | | | | 138/139 |
| 2001/0034924 A1* | 11/2001 | Bozic | ............ | F16L 3/00 |
| | | | | 16/404 |
| 2008/0121303 A1* | 5/2008 | Leggitt | ............ | F16L 11/10 |
| | | | | 138/109 |
| 2009/0194186 A1* | 8/2009 | Gross | ............ | F16L 3/1226 |
| | | | | 138/110 |
| 2010/0180974 A1* | 7/2010 | Gross | ............ | F16L 3/1226 |
| | | | | 138/110 |

* cited by examiner

DIRECTIONAL MAINTAINING APPARATUS FOR FLEXIBLE CONDUIT

The current application claims a priority to the U.S. Provisional Patent application Ser. No. 62/156,468 filed on May 4, 2015.

FIELD OF THE INVENTION

The present invention relates generally to an apparatus for piping. More specifically, the present invention is a bendable and directional maintaining apparatus that is applicable and sized to any existing flexible conduit tubing.

BACKGROUND OF THE INVENTION

Irrigation systems, such as dripping system, spraying systems, and stream systems, utilize flexible piping systems and a plurality of irrigation devices so that water can directed or supplied to the desired locations. Current flexible piping systems cannot be held in place without the use of external clamps, brackets, stabilizers, or expensive specialized tubing such as corrugated metal pipes. If flexible piping systems can be held in place on their own without the use of external forces or expensive tubing, consumers are able to reduce the cost of the irrigation system while gaining an efficient and slim irrigation system.

It is an objective of the present invention to provide a bendable support insert that is inserted into any flexible, pressure rated, polymer conduit-fitting combination. The ability to be bent or shaped by hand to maintain a user-defined configuration of the present invention provide a customizable irrigation system that can be installed around existing obstacles. The present invention also permits the user to emit the conductible media (ie, air, water) to a specific, desired location. Additionally, the present invention is able to eliminate cumbersome retaining members improving the esthetic appearance of the irrigation system without compromising the efficiency of the irrigation system.

DETAIL DESCRIPTIONS OF THE INVENTION

All illustrations of the drawings are for the purpose of describing selected versions of the present invention and are not intended to limit the scope of the present invention.

The present invention is a bendable support insert 1 that allows a flexible conduit tubing 8 to be bent or shaped by hand to remain in a user-defined configuration. In reference to the general configuration, the bendable support insert 1 is inserted into the flexible conduit tubing 8 and secured to the flexible tubing through an adapting device 10. The aforementioned assembly is preferably utilized within irrigation systems so that flexible piping systems can be arranged according to existing obstacles and geographical features. However, the aforementioned assembly can also be utilized within any other types of fluid transport systems such as, fire sprinkler systems, pneumatic tube systems, etc.

Figure 1:
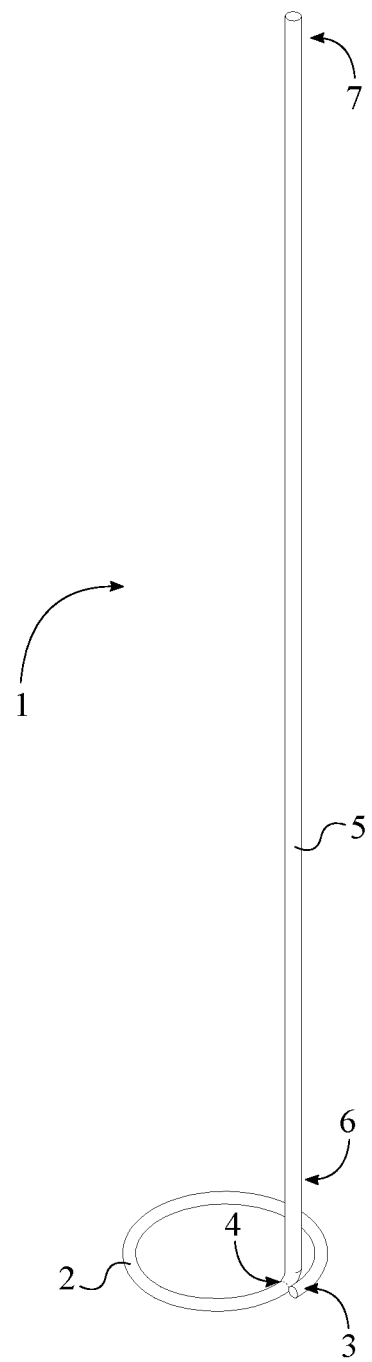
FIG. 1 is a perspective view of the bendable support insert.
Figure 2:
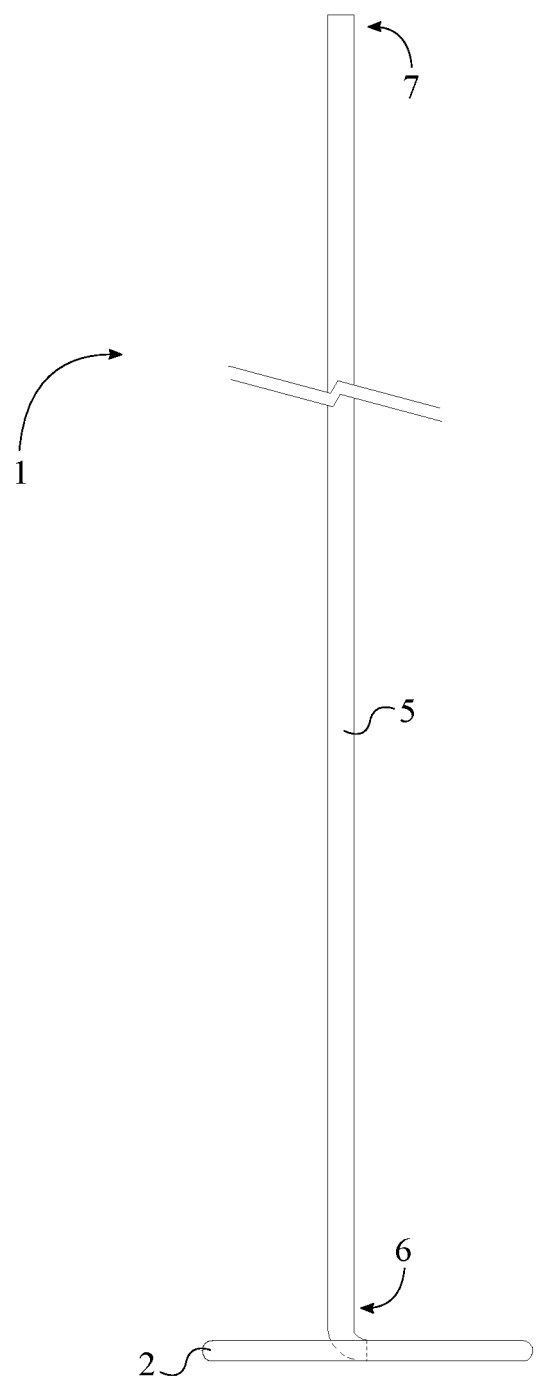
FIG. 2 is a left side view of the bendable support insert.

The bendable support insert 1 is made of corrosion resistance and flexible material that can withstand and retain the user-defined configuration. In reference to FIG. 1-2, the bendable support insert 1 comprises a coiled based portion 2 and a malleable elongated portion 5, wherein the coiled based portion 2 and the malleable elongated portion 5 delineate the overall shape of the bendable support insert 1. In reference to FIG. 1, the coiled based portion 2 comprises an external free end 3 and an internal connector end 4. The external free end 3 is adjacently positioned with the internal connector end 4 forming a ring-shaped for the coiled based portion 2. Additionally, the external free end 3 and the internal connector end 4 create a flat bottom surface within the coiled based portion 2 as the external free end 3 and the internal connector end 4 are circumferentially positioned of each other. As a result of the flat bottom surface, the bendable support insert 1 and the adapting device 10 are able to create flush connection in between the respective components. In reference to FIG. 1-2, the malleable elongated portion 5 comprises a proximal end 6 and a distal end 7, wherein the proximal end 6 and the distal end 7 are oppositely positioned of each other along the malleable elongated portion 5. The proximal end 6 is adjacently connected to the internal connector end 4 in such a way that the malleable elongated portion 5 is positioned perpendicular to the coiled based portion 2. As a result, the malleable elongated portion 5 can be bent or shaped from the proximal end 6 to the distal end 7 optimizing the customization range for the bendable support insert 1. Additionally, the malleable elongated portion 5 can be re-positioned or re-shaped throughout the lifespan of the assembly as needed.

The flexible conduit tubing 8 can be made of flexible and pressure rated materials that allow one or both tube ends to be easily bent or shaped by hand. In reference to FIG. 3, the malleable elongated portion 5 is internally positioned within the flexible conduit tubing 8 in such a way that the coiled based portion 2 is adjacently and externally positioned with a tube end of the flexible conduit tubing 8. As a result, the adapting device 10 is able to connect with the tube end and the coiled based portion 2. More specifically, a female receiving end of the adapting device 10 connects with a first tube end 9 of the flexible conduit tubing 8 as the coiled based portion 2 is positioned in between the first tube end 9 and the adapting device 10, thus eliminating the need for special tools or material to assemble. This configuration is illustrated in FIG. 3.

Figure 3:
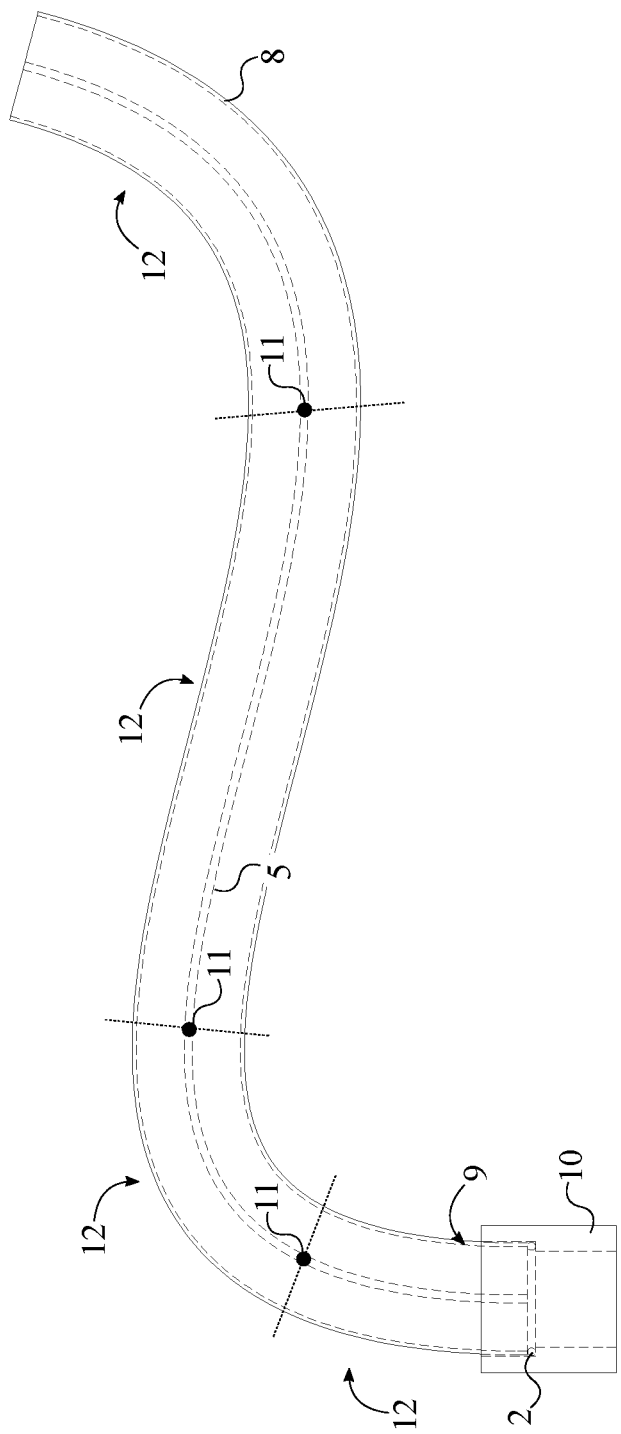
FIG. 3 is a perspective view of the bendable support insert within the flexible conduit tubing, wherein the adapting device secures the bendable support insert to the flexible conduit tubing.

In reference to FIG. 3, a plurality of bending nodes 11 is distributed along the length of the malleable elongated portion 5 as the malleable elongated portion 5 is positioned within the flexible conduit tubing 8. Additionally, a plurality of bent sections 12 is distributed along the length of the flexible conduit tubing 8. As a result, when the malleable elongated portion 5 is bent or shaped from the proximal end 6 to the distal end 7, each of the plurality of bending nodes 11 is pressed against a corresponding bent section from the plurality of bent sections 12.

When the bendable support insert 1 is utilized within an irrigation system, the adapting device 10 secures the bendable support insert 1 and the first tube end 9 of the flexible conduit tubing 8 into a main supply line. Once the bendable support insert 1 and the flexible conduit tubing 8 are secured, the flexible conduit tubing 8 can be bent or shaped according a desired layout along the length of the flexible conduit tubing 8. A second tube end, which is oppositely positioned of the first tube end 9, is formed to receive a discharge unit. The discharge unit for the irrigation system can include, but is not limited to, a drip irrigation and a bubbler irrigation.

However, depending the upon the system that the present invention is utilized within, the discharge unit that connects with the second tube end can differ. For example, the adapting device 10 for a pneumatic tube system can be any type of push-to-connect/poly-hose combination for air.

Although the invention has been explained in relation to its preferred embodiment, it is to be understood that many other possible modifications and variations can be made without departing from the spirit and scope of the invention as hereinafter claimed.

What is claimed is:

1. A retaining device for maintaining a direction of a flexible conduit and coupling the flexible conduit with a component, comprising:
    a coiled base portion having an external free end and an internal connector end in a split spring configuration, wherein the external free end is positioned adjacent to the internal connector end, and wherein the coiled base portion is positioned adjacent to a first end of the flexible conduit such that the component is coupled to the first end of the flexible conduit via the coiled base portion; and
    a malleable elongated portion having a proximal end and a distal end, the malleable elongated portion configured to be deformed with the direction of the flexible conduit, wherein the proximal end is coupled to the coiled base portion via the internal connector end, and the distal end is perpendicularly positioned therefrom.

2. The device of claim 1, wherein:
    the flexible conduit comprises a flexible conduit tubing for irrigation, and
    the flexible elongated portion is internally positioned within the flexible conduit such that the flexible elongated portion maintains the direction of the flexible conduit.

3. The device of claim 2, wherein the flexible conduit has a first bias, wherein the direction of the flexible conduit comprises a bend in a segment of the flexible conduit from the first bias to a second bias, and wherein the bend is located between the proximal end and the distal end of the flexible elongated portion.

4. The device of claim 3, wherein the flexible elongated portion maintains the second bias.

5. The device of claim 1, wherein the coiled base portion is positioned between an opening of the flexible conduit and an opening of the component, and wherein the component is in a fixed position between the coiled base portion and the opening of the flexible conduit.

6. The device of claim 5, wherein the coiled base portion is configured to create a seal between a surface of the flexible conduit and a surface of the component.

7. The device of claim 1, wherein the flexible conduit is a flexible irrigation pipe.

8. A kit for maintaining a direction of a flexible conduit and coupling the flexible conduit with a component, the kit comprising:
    a coiled base portion having an external free end and an internal connector end in a split spring configuration, wherein the external free end is positioned adjacent to the internal connector end, and wherein the coiled base portion is positioned adjacent to a first end of the flexible conduit such that the component is coupled to the first end of the flexible conduit via the coiled base portion; and
    a malleable elongated portion having a proximal end and a distal end, the malleable elongated portion configured to be deformed with the direction of the flexible conduit, wherein the proximal end is coupled to the coiled base portion via the internal connector end, and the distal end is perpendicularly positioned therefrom.

* * * * *